Figure 1:
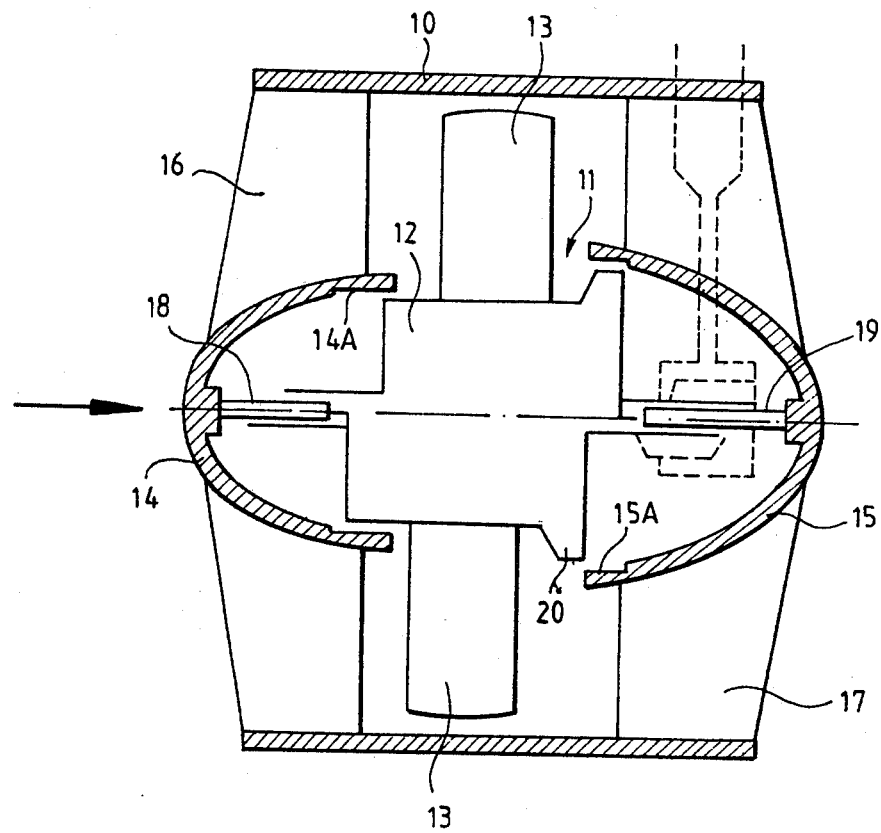

United States Patent [19]

Lett

[11] 4,449,410

[45] May 22, 1984

[54] AXIAL TURBINE FLOWMETERS

[75] Inventor: Roland Lett, Yerres, France

[73] Assignee: Flonic S.A., Montrouge, France

[21] Appl. No.: 422,504

[22] Filed: Sep. 23, 1982

[30] Foreign Application Priority Data

Sep. 30, 1981 [FR] France ............................... 81 18374

[51] Int. Cl.³ ............................................. G01F 1/10
[52] U.S. Cl. .............................. 73/861.91; 73/861.92
[58] Field of Search ........... 73/861.83, 861.89, 861.91, 73/861.92

[56] References Cited

U.S. PATENT DOCUMENTS 3,756,079  9/1973  November .

FOREIGN PATENT DOCUMENTS 1279355  10/1968  Fed. Rep. of Germany .
0787511  12/1957  United Kingdom ............. 73/861.83
1008508  10/1965  United Kingdom ............. 73/861.91

*Primary Examiner*—Charles A. Ruehl
*Attorney, Agent, or Firm*—Dale Gaudier

[57] ABSTRACT

In order to compensate the hydrodynamic pressure on the turbine of a flowmeter, means are provided to create a zone of reduced pressure of constant value upstream of the turbine hub, together with means for creating a zone of pressure, on the downstream face of the hub, varying in a defined manner as a function of the axial position of the turbine. The pressure difference thus created on either side of the turbine hub produces a reaction force tending continuously to balance the hydrodynamic pressure of the fluid whatever the flow rate. The invention is particularly applicable to high flow rate water meters.

2 Claims, 2 Drawing Figures

AXIAL TURBINE FLOWMETERS

The present invention relates to axial turbine fluid flowmeters, or Woltmann-type flowmeters, in which the quantity of fluid flowing in a conduit is measured by means of a turbine which is mounted coaxially in the conduit and the number of turns of which is representative of the instantaneous or cumulative flow.

It is known that in this type of apparatus, the fluid exerts an axial hydrodynamic pressure on the turbine, notably at high flow rates, as a function of the coefficient of drag (Cx) of the turbine blades and of the square of the flow rate. By way of example, for flow rates of the order of 500 m³/hr, the pressure can attain a value of about 12 daN in a conduit of 150 mm diameter.

On the one hand, this axial pressure has the drawback of diminishing the measuring accuracy of the apparatus through the increased frictional resistance which it causes to be applied against the rotation of the turbine and, on the other hand, it has practical damaging effects for the apparatus which manifest themselves as rapid wear of the bearing and the downstream abutment of the turbine and lead to a reduction in the period of operation of the apparatus before replacement of defective components must take place.

Numerous solutions have been proposed to try to compensate or limit the axial pressure on the turbine of this type of apparatus, these solutions generally being based on the artificial creation of a counter-force tending to receive the axial pressure due to the action of the fluid and also to limit the displacement of the turbine. The means put to use for this compensation involve for example a particular profiling of the overall turbine, Venturi effect fairings, pressure supply orifices provided in the fairings and/or the turbine hub, etc. It is possible in fact, by construction, to adjust the drag coefficient of the turbine blades to a desired value; however, the turbines often arrive directly from milling, so there is a manufacturing tolerance with the result that the drag coefficient does not always have the desired value; as a result the pressure correction is obtained for a flow value which is not always the same for all devices, and the problem in question remains only imperfectly resolved.

The invention seeks to alleviate the above-described problems by providing means able to give, in the manner of a servo-system, a true dynamic balance for the axial pressure sustained by the turbine of a Woltmann meter over an extended range of flow rates.

According to this invention there is provided a fluid flowmeter comprising, in a tubular conduit intended to be traversed by a fluid to be measured, a turbine carrying blades at the periphery of a cylindrical hub and mounted for free axial rotation between two fixed fairings, one upstream and the other downstream, means for creating a zone of reduced pressure of approximately constant value beside the upstream face of the said hub, and means for providing a zone of pressure beside the downstream face of the said hub, wherein the said means for providing a zone of pressure beside the downstream face of the hub comprises a combination of the relative profiles of the downstream extremity of the hub and of the downstream fairing, the profile of the hub having at this location an increased diameter, and the profile of the fairing having a hollow cylindrical portion dimensioned to allow the downstream extremity of the hub to extend into the interior of the said fairing, such that the hydrodynamic pressure on the turbine arising from the flow of fluid is continuously balanced by the difference in pressures created on either side of the hub of the turbine.

The means for creating a zone of reduced pressure of approximately constant value beside the upstream face of the turbine blade hub may comprise a hollow cylindrical portion in the downstream extremity of the upstream fairing into which the turbine hub partially extends, whatever the axial position thereof; the abrupt widening of the cross-section of the annular passage at the end of the hub thus causes detachment of the fluid stream with generation of a pressure reduction inside the upstream fairing irrespective of the axial position of the turbine.

The turbine is thus subjected, on the one hand, to the hydrodynamic pressure which arises from the blades, and on the other hand to two opposing forces acting on either side of its hub and resulting from different local pressures which exist on the faces of the respective and different surfaces. Assuming a convenient dimension for the transverse faces of the hub there is thus established for each flow rate a dynamic equilbrium to which there corresponds a well defined position of the turbine along its axis, and finally there exists a stable servo-control of the position of the turbine according to the flow rate of fluid passing through the conduit. By way of example, the position of the turbine varies in an interval of the order of 2.5 mm for flow rates from 3 m³/hr to 500 m³/hr in a conduit of 150 mm, but above all the axial pressure is no longer applied to the bearing and the downstream abutment with the inconvenience and damage previously described.

Figure 2:
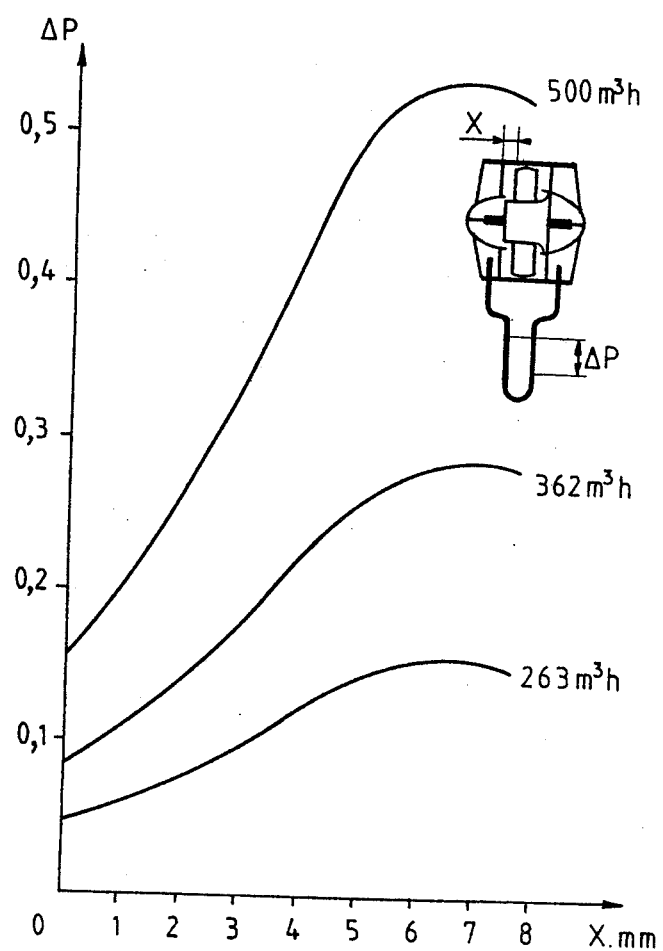

A fluid flowmeter in accordance with this invention will now be described, by way of non-limitive example, with reference to the accompanying drawings, in which:

FIG. 1 shows schematically in axial section a Woltmann meter, and showing in upper and lower half-sections the turbine in two operative positions; and FIG. 2 is a diagram showing the variation of the pressure difference on either side of the turbine hub as a function of its axial position at several flow rates.

Referring to FIG. 1, there is shown, in a section of tubular conduit 10, a turbine 11 comprising a hub 12 of generally cylindrical form provided at its periphery with blades 13 inclined to the axis of the conduit. The turbine 11 is mounted for rotation in normal manner between two hollow fairings, one 14 upstream and the other 15 downstream, the fluid to be measured traversing, in operation, the tubular section 10 in the direction of the arrow. The fairings 14, 15 are coupled to the conduit 10 by substantially radial ribs 16, 17 respectively, and carry internally arms 18, 19 coaxial with the conduit 10 and intended to be disposed in axial bores provided in the ends of the turbine hub 12, thereby permitting it on the one hand to turn freely around the axis of the conduit 10, and on the other hand to move axially along this axis. A downstream abutment, for example a ball, is normally mounted in the bore for the arm 19 but has not been shown in the drawing.

The hub 12 is provided at its downstream end with a worm which meshes with a pinion (shown in broken line) keyed on the output shaft of the meter and coupled externally to means for totalizing and indicating the number of turns made by the turbine.

The upstream fairing 14 has inside its downstream end a right cylindrical portion 14A into which extends the cylindrical portion of the upstream end of the turbine hub 12 during its axial movement.

The hub 12 has at its downstream end a zone 20 of greater diameter than in its right cylindrical portion, and the downstream fairing 15 also has at its upstream end a right cylindrical portion 15A into which the enlarged zone 20 of the hub 12 can extend during the axial movements of the turbine 11.

The radial clearances between the elements 12 and 14A and between the elements 20 and 15A respectively are, by way of example in a 150 mm conduit, of the order of a millimeter.

The operation of the meter described above will now be described with reference to FIG. 2 in which there are shown curves representing for different flow rates, the difference $\Delta p$ (in bars) between the pressures exerted on the upstream and downstream transverse plane faces of the turbine hub as a function of the axial position x thereof relative to a reference position. In this example a conduit of 150 mm diameter has been chosen.

In the absence of fluid flow in the conduit, the turbine occupies an indeterminate axial position. It can be assumed for example that it is located in the position shown in the upper half of FIG. 1. When the fluid starts to flow and the flow rate is less than 3 m$^3$/h, the axial pressure which it exerts on the turbine blades brings it up against the downstream abutment. Given the low flow rate, the hydrodynamic effects developed are insufficient to create on either side of the hub a pressure difference capable of opposing the fluid pressure on the turbine, but this pressure is itself too weak to damage the downstream abutment of the turbine.

As the fluid flow rate increases, the detachment of the fluid stream at the level of the downstream end of the upstream fairing 14 creates a zone of reduced pressure which affects also the interior of the upstream fairing 14. In contrast, the obstacle to fluid flow formed by the periphery of the upstream end of the downstream fairing 15 around the downstream end of the hub 12 creates a local overpressure in the fairing 15. The reduced pressure in the upstream fairing 14 on the one hand and the overpressure in the downstream fairing 15, which acts on a face of the hub of greater diameter, on the other hand, thus gives rise to a reaction force directed upstream. This force, proportional to the difference $\Delta p$ and to the section of the hub 12, is greater than the drag of the turbine blades 13 for the flow rate considered assuming an adequate dimension for the diameter of the hub 12 relative to the torque characteristic and coefficient of drag ($C_x$) of the turbine. The reaction force being greater than the drag, the turbine has a tendency to return upstream. However, during this movement, the pressure difference $\Delta p$ decreases, as indicated by the curves in FIG. 2, since the overpressure in the downstream fairing 15 decreases as the zone 20 of the hub 12 tends to leave the cylindrical portion 15A of the fairing 15. The pressure difference $\Delta p$ thus decreases at the same time as the position x of the turbine, and in consequence the reaction force on the hub 12 also decreases. The turbine thus moves upstream until equilibrium is established between the reaction force on the hub 12 and the drag of the turbine blades at a position in which the turbine stabilizes. Since all the parameters, viz drag of the turbine blades, pressure reduction in the upstream fairing, overpressure in the downstream fairing, which are involved in this process are quantities whose value follows a quadratic law with flow rate, this equilibrium position of the turbine, defined for a given flow rate, remains theoretically the same whatever the flow rate involved. In practice, it is found that changes in the flow regime can slightly displace the theoretical equilibrium position by a small amount, of the order of 2.5 mm, for a large range of flow rates.

Assuming a convenient dimensioning of the transverse faces of the hub 12, a balance is finally obtained of the axial forces which act in opposition on the turbine: hydrodynamic pressure on the one hand, counterforce resulting from different pressures acting on the transverse faces of the hub on the other hand. The curves of flow rate in FIG. 2 show that on each curve there is an increasing linear zone in which a change of x at constant flow is followed by a proportional change in $\Delta p$ such that around an operating point, for example x=3 mm, a kind of stable servo-control of the position of the turbine is established within an interval of the order of a millimeter.

At each flow rate there is thus a corresponding quasi-stable position for the turbine and it can be verified that the abscissa x of this position varies relatively little in an interval of the order of 2.5 to 3 mm for a range of flow rates varying from 3 m$^3$/h to 500 m$^3$/h in the chosen example of a 150 mm conduit.

The provision of such a servo-control of the mean axial position of the turbine thus offers the double advantage of suppressing all damaging effects of the hydrodynamic pressure of the fluid on the parts of the downstream bearing of the turbine which are never exposed to significant forces, and of obtaining a better measuring precision from the turbine by making it operate in its normal positions without friction.

FIG. 1 has been shown in a simplified and schematic manner to facilitate explanation of the principle of operation of the meter according to the invention. It is understood that, in practice, the tubular member enclosing the turbine can be equipped with flanges at its ends to couple it to the conduit traversed by the fluid to be measured and that the structure of the meter normally includes a lateral opening in the tubular member, closed by a cover containing the totalisator and through which the turbine can be mounted between its two fairings and these latter assembled within this member. This known mode of mounting has not been shown and does not form part of this invention. Likewise the output of the meter providing information on the number of turns of the turbine is not necessarily obtained mechanically and can be obtained in a different manner, for example electromagnetically, photoelectrically, etc. by means of an appropriate sensor.

The invention is applicable to fluid flow meters in general, and notably to high-volume water meters.

I claim:

1. A fluid flowmeter comprising, in a tubular conduit intended to be traversed by a fluid to be measured, a turbine carrying blades at the periphery of a cylindrical hub and mounted for free axial rotation between two fixed fairings, one upstream and the other downstream, means for creating a zone of reduced pressure of approximately constant value beside the upstream face of the said hub, and means for providing a zone of pressure beside the downstream face of the said hub, wherein the said means for providing a zone of pressure beside the downstream face of the hub comprises a combination of the relative profiles of the downstream extremity of the hub and of the downstream fairing, the profile of the hub having at this location an increased diameter, and the profile of the fairing having a hollow cylindrical portion dimensioned to allow the downstream extremity of the hub to extend into the interior of the said fairing, such that the hydrodynamic pressure on the turbine arising from the flow of fluid is continuously balanced by the difference in pressures created on either side of the hub of the turbine.

2. A flowmeter according to claim 1, wherein the upstream and downstream transverse faces of the hub have relative diameters dimensionsed such that the pressure difference on either side of the hub, in operation, varies linearly as a function of the axial position of the turbine relative to the downstream fairing.

* * * * *